United States Patent [19]

Shimada et al.

[11] 4,352,452
[45] Oct. 5, 1982

[54] EMERGENCY CONTROLLER FOR AN AIR CONDITIONING SYSTEM OF AN AUTOMOTIVE VEHICLE

[75] Inventors: Yukio Shimada; Naoyoshi Suzuki; Toshio Ohashi, all of Yokohama; Yasushi Inoshita, Tokyo, all of Japan

[73] Assignee: Nissan Motor Company, Limited, Yokohama, Japan

[21] Appl. No.: 197,694

[22] Filed: Oct. 16, 1980

[30] Foreign Application Priority Data

Oct. 22, 1979 [JP] Japan .................. 54-135181

[51] Int. Cl.³ .................................. G05D 23/13
[52] U.S. Cl. ............................ 236/13; 165/24; 236/84
[58] Field of Search ............ 165/43, 24; 236/13, 236/84; 137/867, 868

[56] References Cited

U.S. PATENT DOCUMENTS

| | | | |
|---|---|---|---|
| 2,864,590 | 12/1958 | Moore | 165/24 X |
| 2,893,700 | 7/1959 | Boylan et al. | 165/43 X |
| 3,404,835 | 10/1968 | Rodgers | 236/13 |
| 3,428,115 | 2/1969 | Caldwell | 236/84 X |
| 3,720,371 | 3/1973 | Richards | 165/24 X |
| 3,877,638 | 4/1975 | Amano et al. | 236/87 X |
| 4,262,738 | 4/1981 | Kato et al. | 165/43 X |

Primary Examiner—William E. Tapolcai, Jr.
Attorney, Agent, or Firm—Lane, Aitken, Kice & Kananen

[57] ABSTRACT

An emergency controller for an air conditioning system of an automotive vehicle which incorporates an electronic control circuit in the automatic temperature adjusting means to perform a proportional control over an air mixing door by the use of a vacuum power servo is operated to connect a vacuum source to the vacuum power servo or to cause the air to flow into the vacuum power servo so that the maximum cooling or heating operation can be achieved. Consequently, when a trouble occurs in the electronic control circuit during running in a high-temperature region or low-temperature region, the air conditioning system may immediately be fixed in the maximum cooling or heating operation without intervention of electric circuits.

3 Claims, 9 Drawing Figures

EMERGENCY CONTROLLER FOR AN AIR CONDITIONING SYSTEM OF AN AUTOMOTIVE VEHICLE

BACKGROUND OF THE INVENTION (1) Field of the Invention

The present invention relates generally to an air conditioning system mounted particularly in an automotive vehicle compartment wherein an emergency controller is incorporated for maintaining basic functions of the air conditioning system in addition to a means for adjusting a cooling or heating temperature and, more particularly, to the emergency controller incorporated in the air conditioning system whereby the basic functions of the maximum cooling and heating are maintained by switching the temperature adjusting means to the emergency controller in a case when the temperature adjusting means fails.

(2) Description of the Prior Art

Recently, most air conditioning system of an automotive vehicle have been provided with an automatic temperature adjusting means utilizing advanced electronics technology.

Since the automatic temperature adjusting means comprising an electronic control unit is used in a severe environment where a high resistance to heat and surge voltage is required, some measure must be taken in the air conditioning system against failure. In particular, if such electronic circuit fails, a emergency control means will be required which maintains the basic function of the air conditioning system, such as cooling the air at the maximum output and heating the air at the maximum output. Such emergency control means is usually provided separately from the automatic temperature adjusting means. Some of the emergency control means are put into practical use in the air conditioning system according to this demand from the user.

Two emergency control devices of the prior art are described hereinafter.

One of such emergency control devices comprises a temperature switch provided at the previous output stage of an electronic control circuit for feeding a current into either of a pair of driving transistors to drive the air conditioning system into either of the maximum cooling or heating conditions. In more detail, the temperature switch is located in parallel with a voltage comparator for comparing a temperature-proportional signal with a reference signal to output an automatic control signal and actuates either of the transistors at the last output stage of the electronic control circuit by means on a current signal of a separate power supply line and further actuates a double solenoid vacuum valve connected to the transistors so that maximum vacuum control output can be generated. Thus the double solenoid vacuum valve operates a vacuum power servo which is thus displaced up to a maximum stroke position. Consequently, a rapid switching into either of the maximum cooling or heating conditions can be made for a failure within the electronic control circuit. However, since the temperature switch is located at the previous output stage of the electronic control circuit, the temperature switch works effectively for a failure within the more previous stages from either of the transistors but can no longer perform its emergency measure for a failure of control parts, transistors, or double solenoid vacuum valve located at the successive stages therefrom.

The other emergency control device comprises a sub vacuum selector made of a mechanical element incorporated in a vacuum control circuit and connected to the vacuum power servo. In this air conditioning system, a vacuum output from a vacuum source is under automatic control by means of the electronic control circuit and a transducer. When trouble occurs in an electric circuit, the sub vacuum selector is used manually to fix a maximum cooling, or heating condition. In other words, the sub vacuum selector is operated so that the electronically controlled vacuum output is switched to a manually selectable vacuum output to supply the vacuum power servo with a vacuum output so as to open or close fully an air mixing door.

In this way, such an emergency control device has a feature that only a vacuum control circuit is operated to actuate the vacuum power servo without use of an electric circuit.

The sub vacuum selector comprises a pair of selector members brought in close contact with each other and provides a means for linking the vacuum valve with the double solenoid vacuum valve or vacuum power servo. Such linkage switch is performed by changing the relative angle between both selector members. However, since in the sub vacuum selector the tightly closed selector members are turned with an axle as a fulcrum, a large turning force is required during the manipulation and it is difficult to maintain complete air-tightness in the selector members so that erroneous operation accompanying the air leakage may result.

SUMMARY OF THE INVENTION

With the shortcomings of the prior art devices in mind, it is an object of the present invention to provide of an emergency controller for an air conditioning system an automotive vehicle compartment capable of operating rapidly and reliably in case of emergency such as failure in an electric circuit, wherein an emergency vacuum circuit incorporating another mechanical element in place of the conventional mechanical element such as less reliable sub vacuum selector.

According to the present invention there is provided an emergency vacuum circuit located between a double solenoid vacuum valve and a vacuum power servo comprising an emergency vacuum supply circuit in parallel with the automatic temperature adjusting means; two three-way vacuum switches, one located in a vacuum main circuit for switching an output from the temperature adjusting means and from the emergency vacuum supply circuit, and the other connected between output portion of the forementioned three-way vacuum switch and input portion of the vacuum power servo for switching the vacuum power servo to an air opening circuit; and two switching members mechanically linked to the three-way vacuum switches for switching mechanically each of the three-way vacuum switches, whereby the vacuum power servo is actuated regardless of the operation of the automatic temperature adjusting means by operating either of the switching members when the maximum cooling or heating is required.

BRIEF DESCRIPTION OF THE DRAWINGS

The features and advantages of the air conditioning system according to the present invention will be more clearly appreciated from the following description taken in conjunction with the accompanying drawings where the same reference numerals denote corresponding elements and in which.

DETAILED DESCRIPTION OF THE PREFERRED EMBODIMENTS

Reference will be made to the drawings, and first to FIG. 1 which shows a circuit of the air conditioning system for an automotive vehicle as a first example of the prior art.

Figure 1:
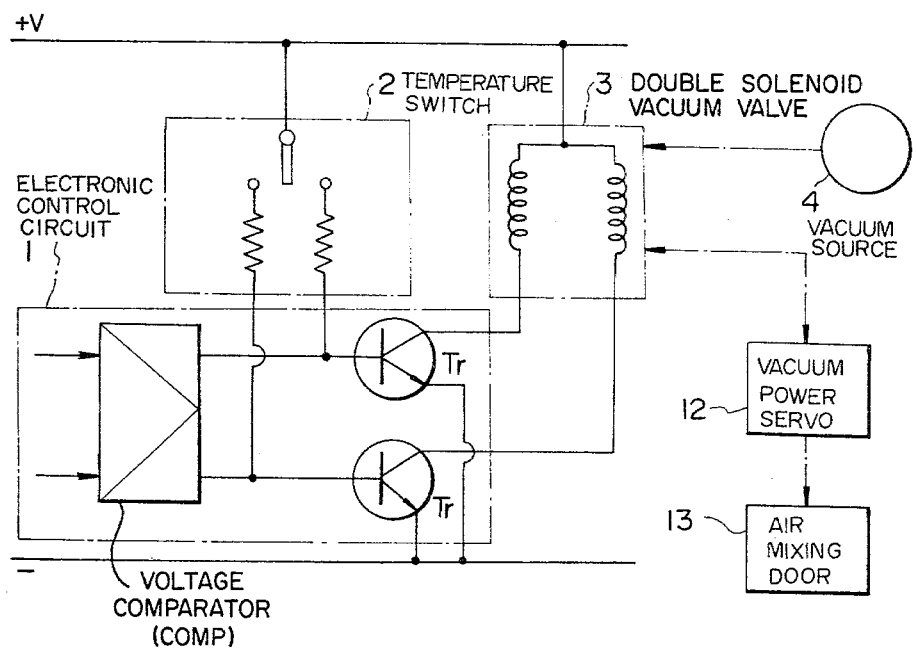
FIG. 1 is a circuit diagram showing an emergency circuit of the air conditioning using a system temperature switch in the first example of the prior art.

In FIG. 1, numeral 1 denotes an electronic control circuit having a voltage comparator COMP and two transistors Tr both bases of which are separately connected to each of the output terminals of the voltage comparator COMP incorporated in an automatic temperature adjusting means of an air conditioning system. Numeral 2 denotes a temperature switch having a contact blade connected to a plus power supply line and contacts connected respectively via resistors to the base of transistors Tr. The emitters of both transistors are connected to a minus power supply line. The collectors of the transistors Tr are connected to a double solenoid vacuum valve 3. Numeral 4 denotes a vacuum source corresponding to such as an engine manifold. The temperature switch 2 is located in parallel with a voltage comparator COMP in the electronic control circuit 1. The voltage comparator COMP outputs an automatic control signal to activate either of the transistors Tr so that the double solenoid vacuum valve 3 connected to the transistors Tr is operated to produce a maximum control output. When the contact blade of the temperature switch 2 is connected to either of the contacts thereof by an operator, the corresponding transistor Tr is turned on irrespective of the comparator COMP output signal. In this way, the double solenoid vacuum valve 3 (abbreviated generally as D.S.V.V.) operates so as to displace and fix a vacuum power servo 12 up to a maximum stroke position. Consequently, rapid switching can be made into a maximum heating or cooling condition when the electronic control circuit fails. However, as is apparent from FIG. 1, the temperature switch 2 is connected to the output of the first stage of the electronic control circuit 1, so that such an emergency circuit as the temperature switch 2 works effectively for a failure in the voltage comparator COMP but cannot serve any longer as the emergency circuit for a failure in either the transistors Tr or the double solenoid vacuum valve 3 located in a subsequent stage relative to the transistors Tr. In this respect, the air conditioning system shown in FIG. 1 has an insufficient effect.

Figure 2:
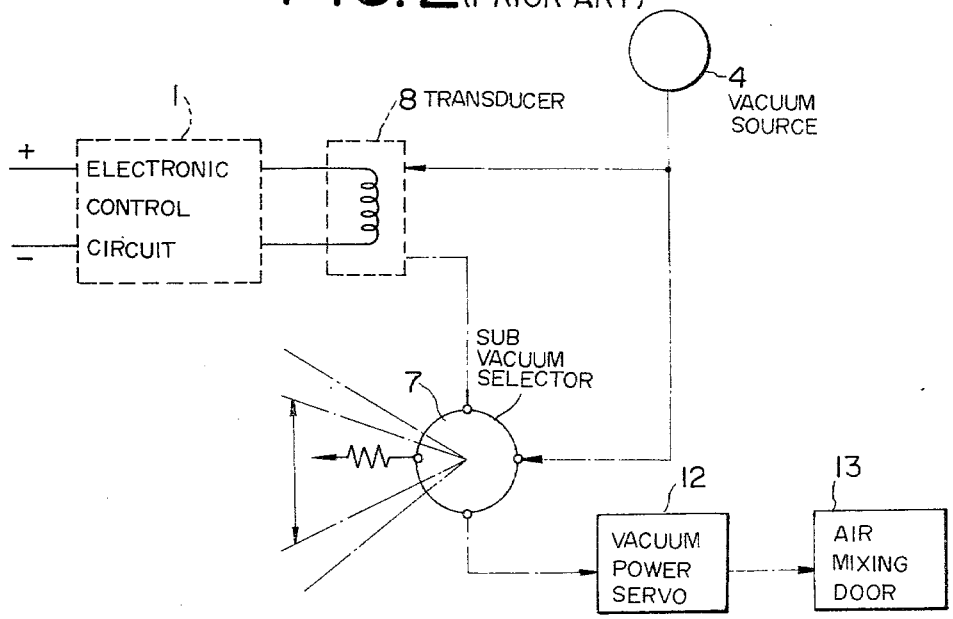
FIG. 2 is a circuit diagram showing another example of emergency circuit of the air conditioning system using a sub vacuum selector in the second example of the prior art.

FIG. 2 shows a second example of the prior art with an improvement made on in the circuit shown in FIG. 1.

Figure 3:
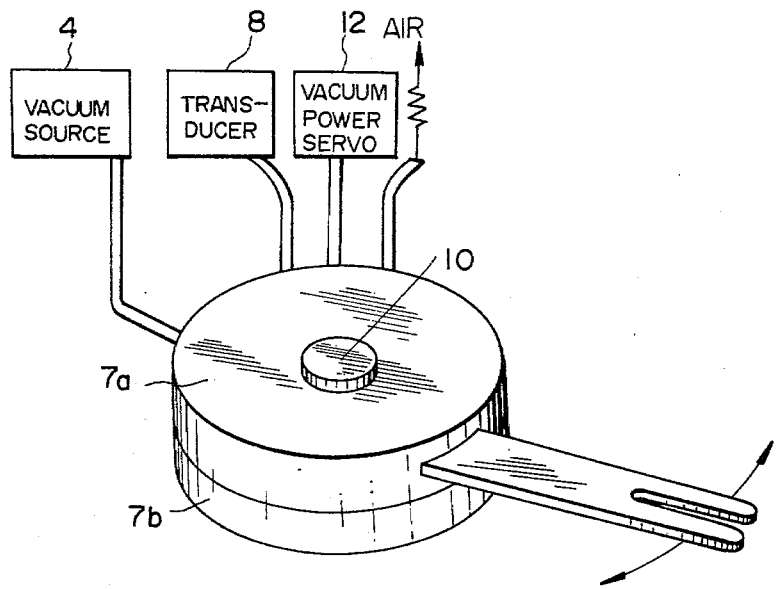
FIG. 3 is a perspective view of the sub vacuum selector shown in FIG. 2.
Figure 4:
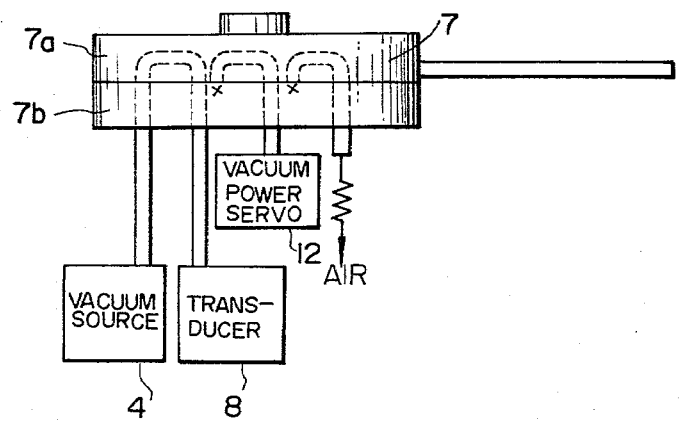
FIG. 4 is a side view of the sub vacuum selector shown in FIG. 2.

Furthermore, FIGS. 3 and 4 show a sub vacuum selector used in the air conditioning system shown in FIG. 2.

In a operating condition, the electronic control circuit 1 and a transducer 8 corresponding to the double solenoid vacuum valve 3 shown in FIG. 1 connected thereto control a vacuum output from the vacuum source 4 automatically. On the other hand, in case of emergency, or, when some trouble occurs in an electric circuit, a sub vacuum selector 7 incorporated in a vacuum control circuit is used to manipulate the fixing of a maximum cooling or heating condition. In other words, the sub vacuum selector 7 is manipulated to switch from an electronically controlled output to a manually selectable vacuum output so that a vacuum output is fed into the vacuum power servo 12 for opening or closing an air mixing door 13.

In this way, there is merit in that only manipulating the sub vacuum selector 7 in the vacuum control circuit enables the operation of the vacuum power servo 12.

As shown in FIGS. 3 and 4, the vacuum selector 7 comprises a pair of selector members 7a and 7b brought in close contact with each other. These selector members 7a and 7b provide a means for selectively connecting an output portion of the transducer 8 or the vacuum source 4 to the vacuum power servo 12 by changing a relative angle between the pair of selector members 7a and 7b to connect between the above-described portions.

However, since the sub vacuum selector 7 of such a construction described above requires both tightly closed selector members 7a and 7b to be turned with a lever attached to either of the selector members 7a and 7b around an axle 10 as a fulcrum as shown in FIG. 3, a large turning force is required. Also, it is quite difficult to maintain air tightness between these selector members 7a and 7b so that an air leakage between both selector members 7a and 7b may result with an erroneous air conditioning operation.

With reference to FIGS. 5 through 9, a preferred embodiment of the present invention will be described hereinafter.

Figure 5:
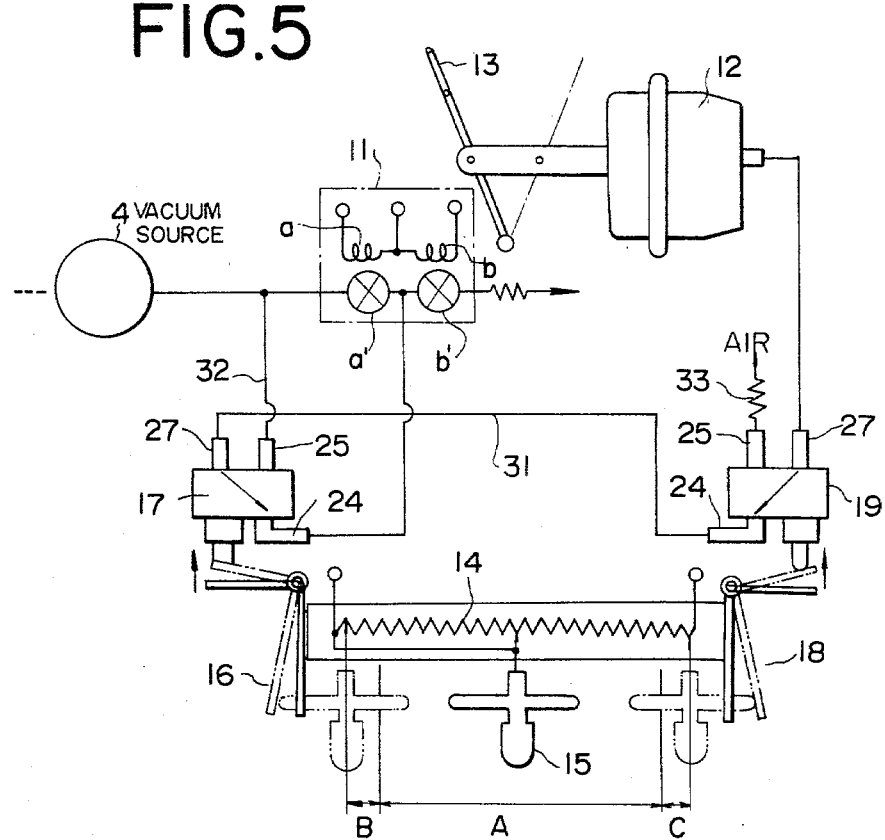
FIG. 5 is a circuit diagram showing the air conditioning system incorporating an emergency controller circuit according to the present invention.

In FIG. 5, the double solenoid vacuum valve 11 corresponding to the numeral 3 shown in FIG. 1 and to the numeral 8 shown in FIGS. 2, 3, and 4, takes a vacuum action from the vacuum source 4 for adjusting a cooling or heating temperature automatically. The double solenoid vacuum valve 11 includes a coil a, one terminal of which is connected to one of the transistors Tr of the electronic control circuit 1 not shown in FIG. 5, coil b, one terminal of which is connected to the other transistor Tr of the electronic control circuit 1 not shown in FIG. 5, a vacuum supply valve a' for conducting a negative pressure source to a controlled circuit when an electric power is supplied to the corresponding coil a from the transistor Tr of the electronic control circuit 1 shown in FIG. 1, and an air opening valve b' for opening the controlled circuit to the air when the electric power is supplied to the corresponding coil b from the other transistor Tr of the electronic control circuit 1 shown in FIG. 1. The output from the double solenoid vacuum valve 11 passes first through a three-way vacuum switch 17 and next through another three-way vacuum switch 19 into the vacuum power servo 12. The vacuum power servo 12 pulls a rod extended therefrom a pivotally rotatable air mixing door 13 located upstream of a heater core within a duct of the air conditioner, the construction of the duct being well known, toward the body of the vacuum power servo 12 as shown by a phantom line and pushes the rod and air mixing door 13 away from it depending on whether the acting output is a negative pressure or a positive pressure so as to perform a proportional control over the opening or closing of the air mixing door 13.

Numeral 14 denotes a variable resistor by means of which the temperature of the air within the vehicle compartment to be adjusted manually is set. The setting of the resistance value can be made by shifting a slidable contact on the resistor with a lever 15. In a range where the lever 15 can be shifted, the section of A shown in FIG. 5 is an automatic temperature adjustment area, the section B a maximum cooling fixing area and the section C a maximum heating fixing area.

When the lever 15 is located in the automatic temperature A adjustment area, a constant-level signal corresponding to a set value of the variable resistor 14 is fed via the electronic control circuit 1 shown in FIG. 1, but not shown in FIG. 5, into the double solenoid vacuum valve 11 to perform an automatic control over the operations of the vacuum supply valve a' and air opening valve b' so that the vacuum power servo 12 performs a predetermined control operation. For example, such a circuit is shown in FIG. 4 of U.S. Pat. No. 3,428,115 wherein applicants' coils a and b correspond to coils 54 and 67 of U.S. Pat. No. 3,428,115, and applicants' variable resistor 14 corresponds to a potentiometer R$_3$ of U.S. Pat. No. 3,428,115.

A vacuum supply conduit 32 extended directly from the vacuum source 4 is connected to a first three-way vacuum switch 17 in parallel with the double solenoid vacuum valve 11 and an air opening conduit 33 is connected to a second three-way vacuum switch 19 in parallel with a main conduit 31. The operation of a switch rod 21 shown in FIG. 6 in the first three-way vacuum switch 17 permits switching between the output conduit of the double solenoid vacuum valve 11 and vacuum supply conduit 32 and also the operation of a switch rod 21 in the second three-way vacuum switch 19 permits switching between the main conduit 31 and the air opening conduit 33.

An L-shaped link 16 having two arms constituting the letter L is disposed in the neighborhood of the switch rod 21 in the first three-way vacuum switch 17 and another L-shaped link 18 is disposed in the neighborhood of the switch rod 21 in the second three-way vacuum switch 19.

The link 16 comes in touch with the lever 15 when the lever 15 is shifted up to the maximum cooling fixing area B so as to depress the switch rod in the first three-way vacuum switch 17.

The link 18 comes in touch with the lever 15 when the lever 15 is shifted up to the maximum heating fixing area C so as to depress the switch rod 21 in the second three-way vacuum switch 19.

When the air conditioning system operates in the normal adjusting temperature area, these first and second three-way vacuum switches 17 and 19 connect the output conduit of the double solenoid vacuum valve 11 to the main conduit 31 and connect the main circuit 31 to the input portion of the vacuum power servo 12, respectively as shown by solid lines with arrows.

Therefore, in the normal operating state, the output of the double solenoid vacuum valve 11 passes the main conduit 31 via the first three-way vacuum switch 17 and second three-way vacuum switch 19 into the vacuum power servo 12.

On the other hand, when some trouble occurs in the electric circuits of the air conditioning system, the vacuum circuit as described above is interrupted so that a vacuum pressure cannot have an effect on the vacuum power servo 12.

In this case, the user shifts the lever 15 up to a right or left end so that a negative or positive pressure generated by an emergency controller thus comprised can be supplied to the vacuum power servo 12 without reception of action from the electric circuits.

Figure 6:
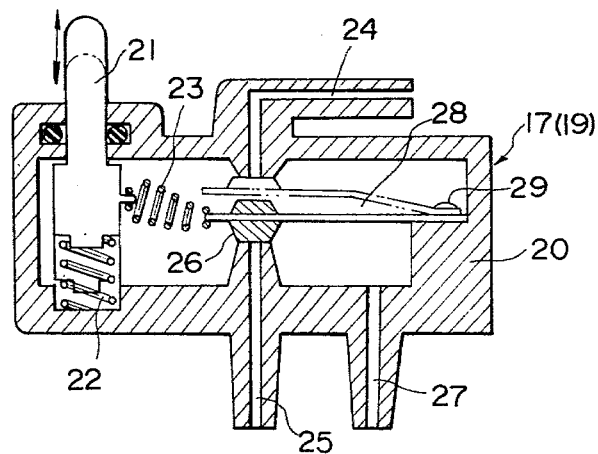
FIG. 6 is a sectional view showing an internal construction of a three-way vacuum switch used in the air conditioning system shown in FIG. 5.

FIG. 6 shows an example of such three-way vacuum switches 17 and 19.

The three-way vacuum switch comprises substantially a housing 20 having three vacuum passage holes 24, 25 and 27, a push rod 21 whose head portion is projected out of the housing 20 and bottom portion is engaged with a return spring 22, and a valve body 26 on a flat spring 28 for closing either of the vacuum passage holes 24 or 25. The flat spring 28 is attached to the housing 20 by means of a screw 29 at its right-side end. The left-side end of the flat spring 28 is connected to a snap spring 23 attached to the rod 21 at its longitudinal side portion.

As shown in FIG. 6, the snap spring 23 energizes the flat spring 28 downward so as to close the vacuum passage hole 25. At this time, the vacuum passage hole 24 is linked with the vacuum passage hole 27. When the rod 21 is pushed downward against the force of the return spring 22, the snap spring 23 acts to push the flat spring 28 upward so that the flat spring 28 and valve body 26 snaps up to close the vacuum passge hole 24 while the vacuum passage hole 25 is opened. At this time, the vacuum passage hole 25 is linked with the vacuum passage hole 27.

Thus, a switching operation of the three-way vacuum switches 17 and 19 occurs.

Figure 7:
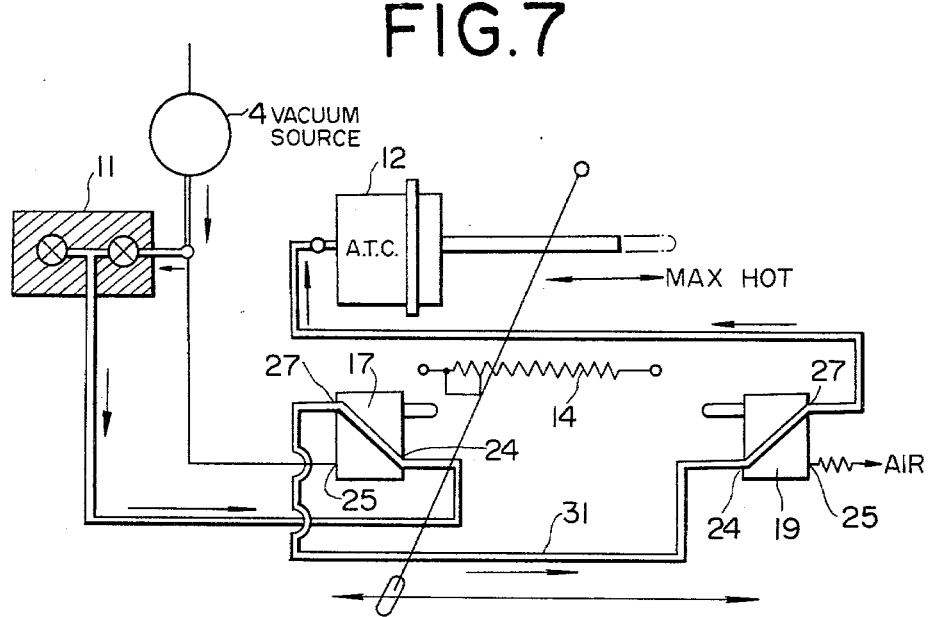
FIG. 7 is a simplified circuit diagram showing the air conditioning system shown in FIG. 6 when an automatic temperature control is performed in the range of normal temperature adjustment.
Figure 8:
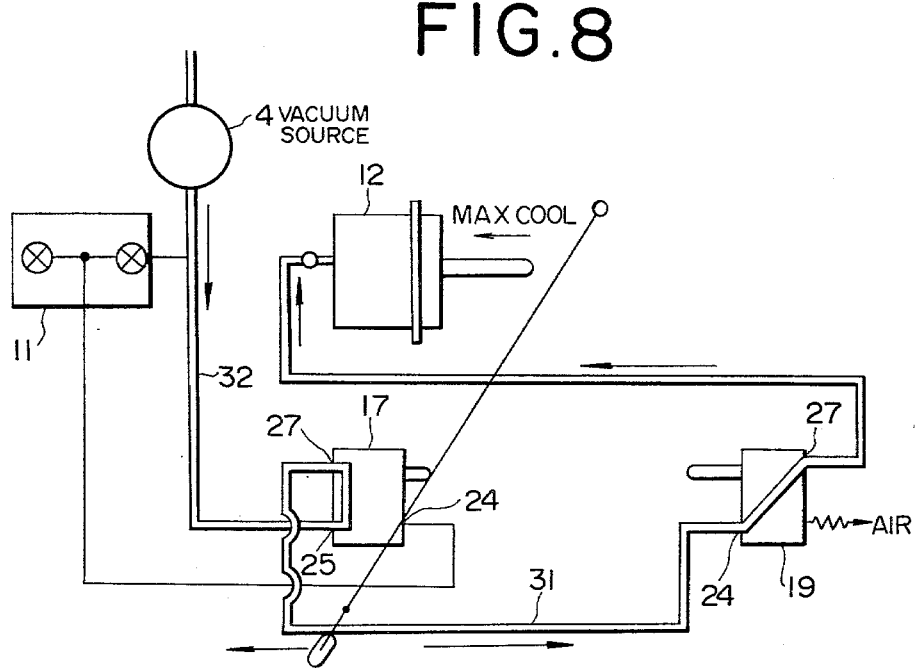
FIG. 8 is a simplified circuit diagram showing the air conditioning system shown in FIG. 6 when maximum cooling is performed during the depression of a first switching member onto a first three-way vacuum switch.
Figure 9:
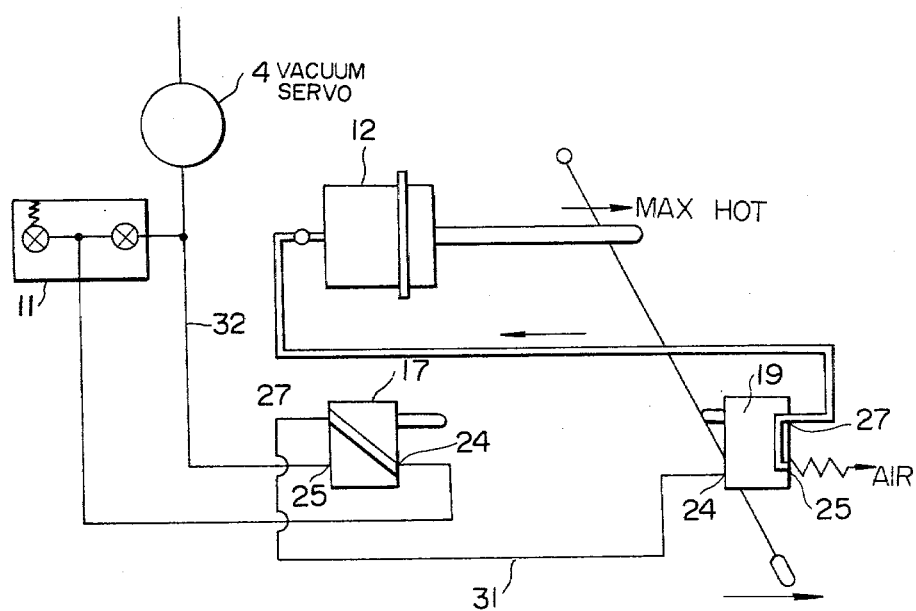
FIG. 9 is a simplified circuit diagram showing the air conditioning system shown in FIG. 6 when maximum heating is performed during the depression of a second switching member onto a second three-way vacuum switch.

FIGS. 7 through 9 show a vacuum control circuit and an emergency controller comprised by switching either of the three-way vacuum switches 17 and 19.

FIG. 7 shows a configuration of the vacuum control circuit when the air conditioning system performs an automatic temperature adjustment. This is achieved by locating the lever 15 in the automatic temperature adjustment area A (FIG. 5).

A vacuum pressure from the vacuum source 4 is conveyed into the double solenoid vacuum valve 11 wherein the vacuum pressure is automatically controlled or adjusted to a desired value according to an electrical signal fed from the electronic control circuit 1 shown in FIG. 1. The automatically controlled vacuum pressure is then passed through the first three-way vacuum switch 17 at the vacuum passage holes 24 and 27 through the main conduit 31 and through the second three-way vacuum switch 19 at the vacuum passage holes 24 and 27 into the vacuum power servo 12. The vacuum pressure is conveyed as shown by solid lines with arrows attached near the dual lines. Hence, the vacuum power servo 12 and air mixing door (omitted in this drawing) operate depending on the control operation of the double solenoid vacuum valve 11.

FIG. 8 shows a configuration of the vacuum control circuit which serves as an emergency controller when the air conditioning system is fixed in the maximum cooling operation.

If trouble in a certain electric circuit in the air conditioning system occurs when the automotive vehicle is running in a high-temperature area (for example, in a tropical zone or in a desert), the user may shift the lever 15 up to the maximum cooling fixing area B, that is, up to the leftmost stroke end as shown by a phantom line in FIG. 5. At this time, the lever 15 pushes the link 16 to depress the switch rod 21 of the first three-way vacuum switch 17. When the first three-way vacuum switch 17 is switched in this way, the vacuum control circuit acts as an emergency controller to fix the air conditioning system in the maximum cooling operation.

In this circuit configuration shown in FIG. 8, the vacuum pressure from the vacuum source 4 enters the first three-way switch 17 via the vacuum supply conduit 32 at the vacuum passage hole 25 and leaves the first three-way vacuum switch 17 at the vacuum passage hole 27 for the vacuum power servo 12. The vacuum pressure is conveyed as shown by the solid lines with arrows attached near the dual lines. Therefore, the vacuum power servo 12 and air mixing door (omitted in this drawing) operates under the maximum vacuum pressure so as to fix the air conditioning system in the maximum cooling operation. At this time, the output circuit from the double solenoid vacuum valve 11 is interrupted at the internal part of the first three-way vacuum switch 17, so that the output from the double solenoid vacuum valve 11 has no relation to the operation of the vacuum power servo 12.

FIG. 9 shows another configuration of the vacuum control circuit which serves as an emergency controller when the air conditioning system is fixed in the maximum heating operation.

If trouble in a certain electric circuit in the air conditioning system occurs when the automotive vehicle is running in a cold district, the user may shift the lever 15 up to the maximum heating fixing area C, that is, up to the rightmost stroke end as shown by a phantom line in FIG. 5. At this time, the lever 15 pushes the link 18 to depress the switch bar of the second three-way vacuum switch 19. When the second three-way vacuum switch 19 is switched in this way, the vacuum control circuit particularly the second three-way vacuum switch acts as the emergency controller to fix the air conditioning system in the maximum heating operation.

In this circuit configuration, the vacuum passage hole 24 of the second three-way vacuum switch 19 is closed and other vacuum passage holes 25 and 27 are linked together so that the vacuum passage holes 25 and 27 and vacuum power servo 12 consitute a series circuit as shown by dual lines between the vacuum power servo 12 and vacuum passage 25 of the second three-way switch 19. Since the vacuum passage hole 25 is opened to the air, the vacuum power servo 12 goes in a non-pressure state so as to fix the air conditioning system in the maximum heating operation. In addition, since the vacuum passage hole 24 of the second three-way vacuum switch 19 is closed and the main conduit 31 is not linked with the second three-way vacuum switch 19, the vacuum output from both vacuum source 4 and double solenoid vacuum valve 11 has no relation to the operation of the vacuum power servo 12.

As is apparent from the preceding description, there is provided no electric circuit used in the emergency controller for operating the vacuum power servo in the mode of either maximum cooling or heating operation.

In the embodiment described above, an emergency measure can be taken by a mechanical operation against the electric circuit failure of the double solenoid vacuum valve 3, 11, two transistors Tr and electronic circuit 1, and so forth.

As described hereinbefore, according to the present invention there is provided an emergency controller of different types according to which mode of maximum operation is required wherein two three-way vacuum switches are used which are capable of performing an instantaneous and secure switching action.

Therefore, a highly reliable emergency operation can be made without receipt of action from other electrical circuits. Since the three-way vacuum switches are relatively simple in construction and easy to handle, there arises almost no problem of a vacuum leakage and incorrect operation of a switch as found in other vacuum switches.

Furthermore, the three-way vacuum switch is simple in construction as described above so that its size and weight can be reduced in the same way as an electric microswitch and the manufacturing cost of the air conditioning system can be decreased. It will be clearly understood by those skilled in the art that modifications may be made in the preferred embodiment described hereinbefore without departing the spirit and scope of the present invention, which is to be defined by the appended claims.

What is claimed is:

1. An emergency controller for an air conditioning system of an automotive vehicle incorporating an automatic electric temperature adjusting means connected to a vacuum control circuit, the vacuum control circuit being normally connected between a vacuum source and vacuum power servo, for performing a proportional control over an air mixing door, the emergency controller comprising:
    (a) a vacuum supply conduit connected directly to the vacuum source; and
    (b) a first three-way vacuum switch connected to said vacuum supply conduit and vacuum control circuit for switching the connection of the vacuum power servo from the vacuum control circuit to said vacuum supply conduit;
    (c) a first switching member operatively connected to said first three-way vacuum switch for mechanically switching said first three-way vacuum switch;
    (d) a second three-way vacuum switch connected to said first three-way vacuum switch and the vacuum power servo for switching the connection of the vacuum power servo from said first three-way switch to an air opening conduit;
    (e) a second switching member operatively connected to said second three-way vacuum switch, said first and second switching members positioned for manual actuation by an operator of the vehicle for switching said first and second three-way vacuum switches upon failure of said automatic electric temperature adjusting means.

2. An emergency controller for an air conditioning system as set forth in claim 1, wherein said first and second three-way vacuum switches have the same structure which comprise:
(f) a housing;
(g) a rod whose head portion is projected out of said housing and bottom portion is engaged with a return spring;
(h) a flat spring whose one end is fixedly attached to said housing;
(i) a first vacuum passage hole;
(j) a second vacuum passage hole;
(k) a third vacuum passage hole;
(l) a snap spring whose one end is connected to a side portion of said rod and other end is connected to the other end of said flat spring; and
(m) a valve body located on said flat spring for immediately closing said first vacuum passage hole when the head portion of said rod is projected out of said housing and for immediately closing said second vacuum passge hole when the head portion of said rod is pushed toward internal portion of said housing.

3. An emergency controller for an air conditioning system as set forth in claim 2, wherein said first and second switching members have the same shape and comprise:
(n) an L-shaped link whose one arm is pushed by one end of a cross-shaped movable contact lever for setting an air conditioning temperature of the automatic temperature adjusting means and the other arm correspondingly pushes said rod into said housing, whereby said vacuum supply circuit is connected to the vacuum power servo when said first three-way vacuum switch is switched to link said third vacuum passage hole with said second vacuum passage hole by pushing said first switching member with the contact lever so that the vacuum pressure from the vacuum source can directly be conveyed to the vacuum power servo to achieve the maximum cooling operation and, on the other hand, the vacuum power servo is connected to the air opening circuit when said second three-way vacuum switch is switched to link said third vacuum passage hole with said second vacuum passage hole by pushing said second switching member with the contact lever so that the air from the air-opening circuit can flow into the vacuum power servo to achieve the maximum heating operation.

* * * * *